United States Patent [19]

Frei

[11] Patent Number: 4,635,841
[45] Date of Patent: Jan. 13, 1987

[54] METHOD FOR BRINGING TOGETHER THE EDGES OF A BLANK OF SHEET METAL ROLLED TO A CYLINDER AS WELL AS A GUIDE APPARATUS FOR PERFORMING THE METHOD

[75] Inventor: Siegfried Frei, Gallen, Switzerland

[73] Assignee: Cantec, Inc., Fort Worth, Tex.

[21] Appl. No.: 679,637

[22] Filed: Dec. 7, 1984

[30] Foreign Application Priority Data

Dec. 21, 1983 [CH] Switzerland .................. 6816/83

[51] Int. Cl.⁴ .................. B23K 31/06; B23K 37/04
[52] U.S. Cl. .................. 228/147; 228/151; 228/17.5; 72/52; 219/61.3
[58] Field of Search .......... 228/17, 17.5, 43, 146–151; 219/61.13, 61.3; 72/52

[56] References Cited

U.S. PATENT DOCUMENTS

| | | | |
|---|---|---|---|
| 1,784,024 | 12/1930 | Newell | 228/151 |
| 2,613,303 | 10/1952 | Babbitt | 228/17.5 X |
| 3,834,010 | 9/1974 | Wolfe et al. | 219/61.3 X |
| 4,214,140 | 7/1980 | Opprecht | 219/61.3 |
| 4,272,004 | 7/1981 | Nilsen | 228/17.5 |
| 4,308,662 | 1/1982 | Bohannon | 72/52 X |
| 4,354,090 | 10/1982 | Nilsen | 228/17.5 X |

FOREIGN PATENT DOCUMENTS 644274  4/1937  Fed. Rep. of Germany ........ 228/17

Primary Examiner—Nicholas P. Godici
Assistant Examiner—Carmine Cuda
Attorney, Agent, or Firm—Werner W. Kleeman

[57] ABSTRACT

A guide rail serves for bringing together the edges of blanks of sheet metal rolled to form cylinders. The guide rail contains curved guide slots for the sheet metal edges. The guide slot bases are planar and converge toward the exit end of the guide rail. The sheet metal edges guided in the curved guide slots tend—after a first weld point has been made—to translate toward one another due to their innate elasticity.

23 Claims, 16 Drawing Figures

METHOD FOR BRINGING TOGETHER THE EDGES OF A BLANK OF SHEET METAL ROLLED TO A CYLINDER AS WELL AS A GUIDE APPARATUS FOR PERFORMING THE METHOD

BACKGROUND OF THE INVENTION

The present invention broadly relates to joining sheet metal or sheet material and, more specifically, pertains to a new and improved method and apparatus for bringing together or uniting the edges or edge regions of a blank or panel of sheet metal or sheet material In the present invention the edges of the sheet metal blank, which is rolled or formed substantially to a cylinder, are brought together during transport of the formed or rolled blank or panel from a forming or rolling machine to a joining or welding station. The welding station is preceded by a guide apparatus serving for conducting the formed or rolled panel into the welding station. The rolled or formed cylinder has a longitudinal axis or axis of rotational symmetry. The guide apparatus comprises a substantially bar-shaped support member or body arranged immediately before the joining or welding station and containing two lateral guide slots for the edges of the blank or panel of sheet metal or sheet material. The two guide slots each have an entry end and an exit end and mutually converge from the entry end to the exit end.

Guide devices, also known as Z-rails, are known from the general state of the prior art and are especially employed in welding together the edges of blanks or panels of sheet metal rolled to cylindrical or tubular bodies and in which the sheet metal edges mutually overlap. Such guide rails are provided with two straight slots guiding both sheet metal edges and inducing the sheet metal edges to overlap. These slots initially have a mutual vertical spacing which then decreases toward the end of the rail. The bases of both slots contain a greater spacing in the horizontal direction initially than at the end of the rail, so that the sheet metal edges guided in the slots can be conducted out of a relatively great overlap into a desired and precisely predetermined lesser overlap (cf. Swiss Patent No. 602,255, granted July 31, 1978).

It is furthermore also known in the art to provide such Z-rails with a pivotable end piece in order that the sheet metal edges exiting from the slots at the ends of the Z-rail can be oriented very precisely in relation to the clamping line between both electrode rollers of the welding machine without the sheet metal edges having to be even slightly deflected at the welding location after leaving the Z-rail (cf. German Pat. No. 2,839,407 and the cognate U.S. Pat. No. 4,214,140, granted July 22, 1980). The pivotable end piece, which is severed from the initially integrally fabricated Z-rail and subsequently reconnected thereto by a hinge, comprises, as does the principle component, straight slots converging toward the end of the Z-rail.

For butt-welding two cut edges, Z-rails are also employed in which the cut edges are initially spaced vertically in relation to one another as in the previously mentioned rail, but which do not, however, mutually overlap but are held precisely in a common vertical plane and are brought into edge contact at the end of the Z-rail (cf U.S. Pat. No. 4,354,090, granted Oct. 12, 1982).

The edges of exactly cut blanks or panels of sheet metal can be rapidly and reliably brought together by this know device and conducted to an energy beam welding location (e.g. laser, electron beam, and so forth) and butt-welded.

It is very difficult and expensive to produce absolutely straight cut edges outside of the laboratory at high production rates, since even the slightest deviations in concentricity of the cutter wheels or disks of the currently very commonly employed rolling shears cause a wobble effect of the cutting edges of the wheels or disks and therefore produce a curved or arcuate course or extent of the cut edges they produce. When bringing together or butting such blanks or panels with so-called curved cuts or bowed edges, the edges to be welded together therefore no longer lie flush against one another over the entire length. This can lead to faulty welds or, if the arc height is so great that the edges lie far apart, to unwelded zones along the locus of the joint.

Furthermore, the still unwelded blank or panel edges tend to spread apart from one another during the welding process. In order to compensate this spreading effect, it has been proposed in Z-rails for overlap welding machines to conduct the blank or panel edges initially overlapping more than necessary, i.e. more than the amount of overlap at the weld location and to bring them to the desired actual value only immediately at the welding location In this manner the spreading effect can be compensated.

This measure for butt-welding can not be employed for slightly curvedly cut or bowed blank or panel edges, since the deficiency of sheet metal in the bowed region can not be supplied by this measure.

In order to be able to hold together both blank or panel edges overlapping in practice by less than a millimeter, pressure means must be provided in this region, e.g. a calibrating roller ring, which firmly guides the tubular sheet metal body. Firm guidance of the thin sheet metal body has great disadvantages, since high friction arises in the slots of the Z-rail due to the high pressure of the sharp panel edges, and heavy wear therefore occurs and scratches can arise on the surface of the sheet metal body.

SUMMARY OF THE INVENTION

Therefore, with the foregoing in mind, it is a primary object of the present invention to provide a new and improved method and apparatus for bringing together the edges of a blank or panel of sheet metal or sheet material formed to a cylinder which does not exhibit the aforementioned drawbacks and shortcomings of the prior art constructions.

Another and more specific object of the present invention aims at providing a new and improved method and apparatus of the previously mentioned type which permit in butt-welding always bringing even inaccurate blanks or panels exhibiting a non-straight cut edge flushly together and which ensure a constant overlap without considerable tangential pushing forces having to be applied to the blank or panel edges from the exterior.

Yet a further significant object of the present invention aims at providing a new and improved construction of a guide apparatus of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the method of the present invention is manifested by the features that it comprises the steps of arcuately curving edges or edge regions of the sheet metal blank or panel toward a longitudinal axis of the cylinder formed by the sheet metal blank or panel before the edges or edge regions enter into mutual contact and before the edges or edge regions subsequently arrive in the joining or welding station.

In other words, the method of the present invention is manifested by the features that it comprises the steps of: transporting the blank or panel of sheet material formed to a substantially cylindrical shape having an axis of rotational symmetry to a guide apparatus; conducting the formed blank or panel into the guide apparatus with the edge regions thereof in operatively associated relationship; conducting the formed blank or panel through the guide apparatus to bend the edge regions longitudinally inward toward the axis of rotational symmetry such that the edge regions enter into mutually abutting contact (i.e. with either the end faces or side faces to be joined or welded of the blank edge regions in mutual contact); further conducting the formed blank or panel with the edge regions thereof in mutually abutting contact to a joining station arranged immediately subsequent to the guide apparatus; and joining the mutually abutting edge regions together in the joining station to form a permanently closed substantially cylindrical thin wall tube.

The apparatus of the present invention is manifested by the features that it comprises two guide slots having an arcuate extent which is curved toward the longitudinal axis of the cylinder of the formed blank and in these guide slots the edge regions of the blank of sheet metal are guided.

In other words, the apparatus of the present invention is manifested by the features that it comprises: a substantially bar-shaped guide body or rail provided with two guide slots situated on opposite sides of the guide body or rail and extending longitudinally therein in mutually spaced relationship for guiding the edge regions of the formed blank through the guide apparatus; a joining station arranged immediately subsequent to the guide rail; the two guide slots each having an entry end remote from the joining station and an exit end proximate to the joining station; the mutually spaced relationship of the guide slots diminishing from the entry end to the exit end; and the two guide slots extending in a path curving inwardly toward an axis of rotational symmetry of the substantially cylindrical shape of the formed blank or panel.

The surprising effect has been observed that not only can irregularities of the cut edges of the blank or panel be compensated by the curved or arcuate path of the guide slots or eliminated during the joining or welding process, but also that both edge or joining surfaces of the cut edges lie flush against one another after exiting from the guide rail and during the butt-welding process, so that the edge regions which soften at the welding location are upset or compressed and welded or forged without requiring the assistance of calibrating means, e.g. a roller ring, exerting a biasing or stressing force on the blank or panel. The omission of the pressure or calibrating means acting on the blank or panel of sheet metal has the advantage that the rolled blank or panel can be transported along the guide rail with low resistance and therefore the danger of dents and marks on the blank or panel by transport fingers or equivalent facilities can be prevented. Furthermore, due to the omission of pronounced pressure or calibrating means which otherwise would have to generate the welding force necessary for butt-welding, the guide rails, and especially the bases of their guide slots, are subjected to a considerably reduced wear from the sharp blank or panel edges. The reduction of circumference or periphery of the formed blank arising in butt-welding is also continuously compensated.

In sheet metal blank or panel edges to be welded in overlap, the hitherto necessary overlap width of the blank or panel edges diminishing toward the end of the Z-rail can, on the one hand, be foregone and, on the other hand, the guide means holding the blank or panel edges in overlapping relation can also be partially foregone. As in butt-welding, wear in the Z-rails also decreases in this application, namely in that the biasing or stressing force of both blank or panel edges to be joined or welded is not brutally applied to the thin and very sensitive blanks or panels externally as heretofore, but is generated in natural manner by their own stress due to three-dimensional bending.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
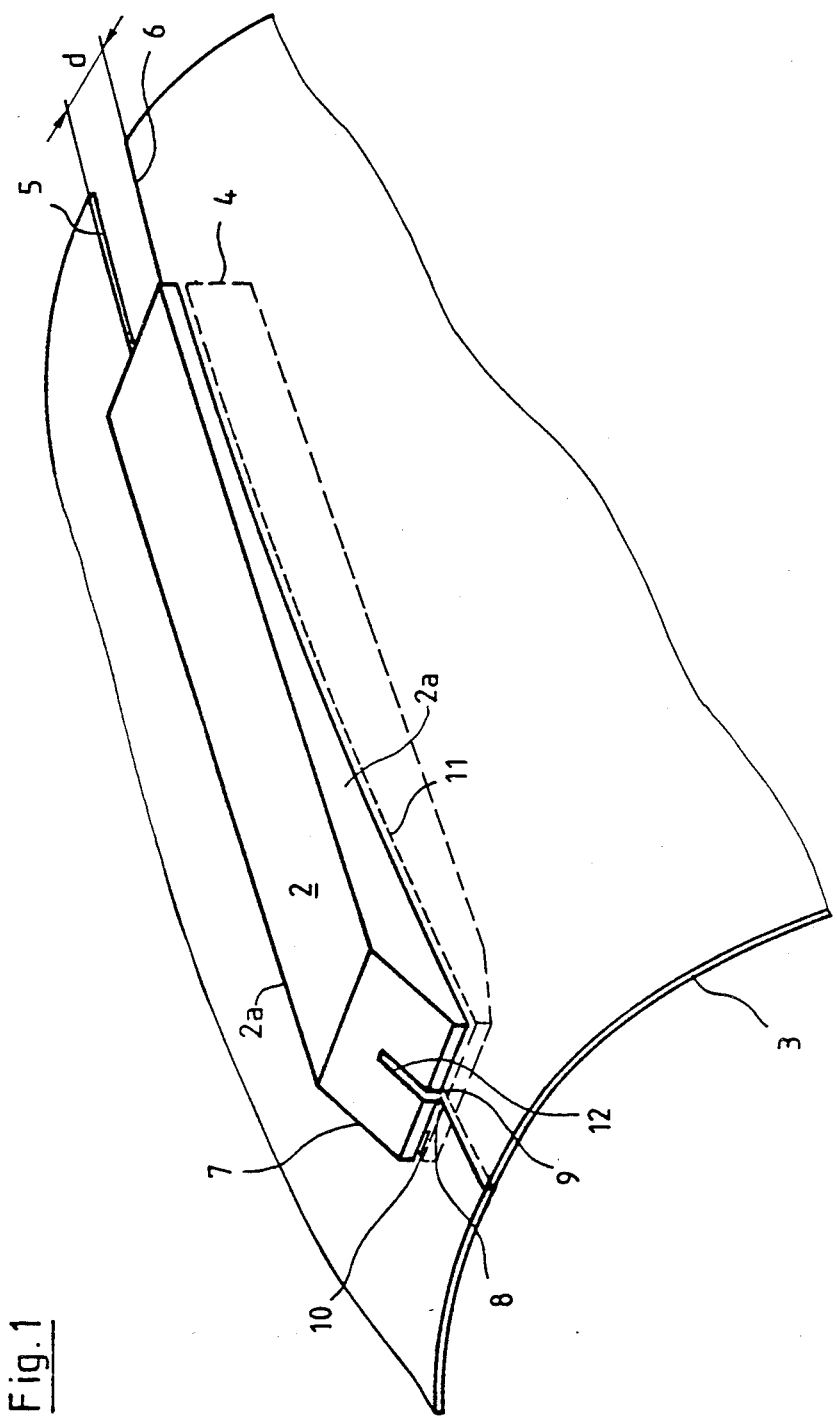
FIG. 1 schematically shows a perspective view of a guide rail for blank or panel edges to be brought into a butting relationship as well as of a blank or panel of sheet metal rolled to a cylinder.

Describing now the drawings, it is to be understood that to simplify the showing thereof only enough of the structure of the guide apparatus and related structure has been illustrated therein as is needed to enable one skilled in the art to readily understand the underlying principles and concepts of this invention. Turning now specifically to FIG. 1 of the drawings, the apparatus illustrated therein by way of example and not limitation and employed to realize the method as hereinbefore described will be seen to comprise a guide rail 2 illustrated as a longitudinally extending body or support member. Two guide slots 10 and 11 extend over the entire length of the guide rail 2 and are arranged at both mutually opposing vertical flanks 2a. The bases 8 and 9 of the guide slots 10 and 11, respectively, exhibit a spacing d on the entry or infeed end 4—the right-hand side in the figure. Both bases 8 and 9 of the guide slots 10 and 11, respectively, meet at the exit or outfeed end 7. A web 12 separating the two mutually opposed guide slots 10 and 11 and forming the bases 8 and 9 of the guide slots 10 and 11, respectively, therefore comprises the form of a wedge.

Figure 2:
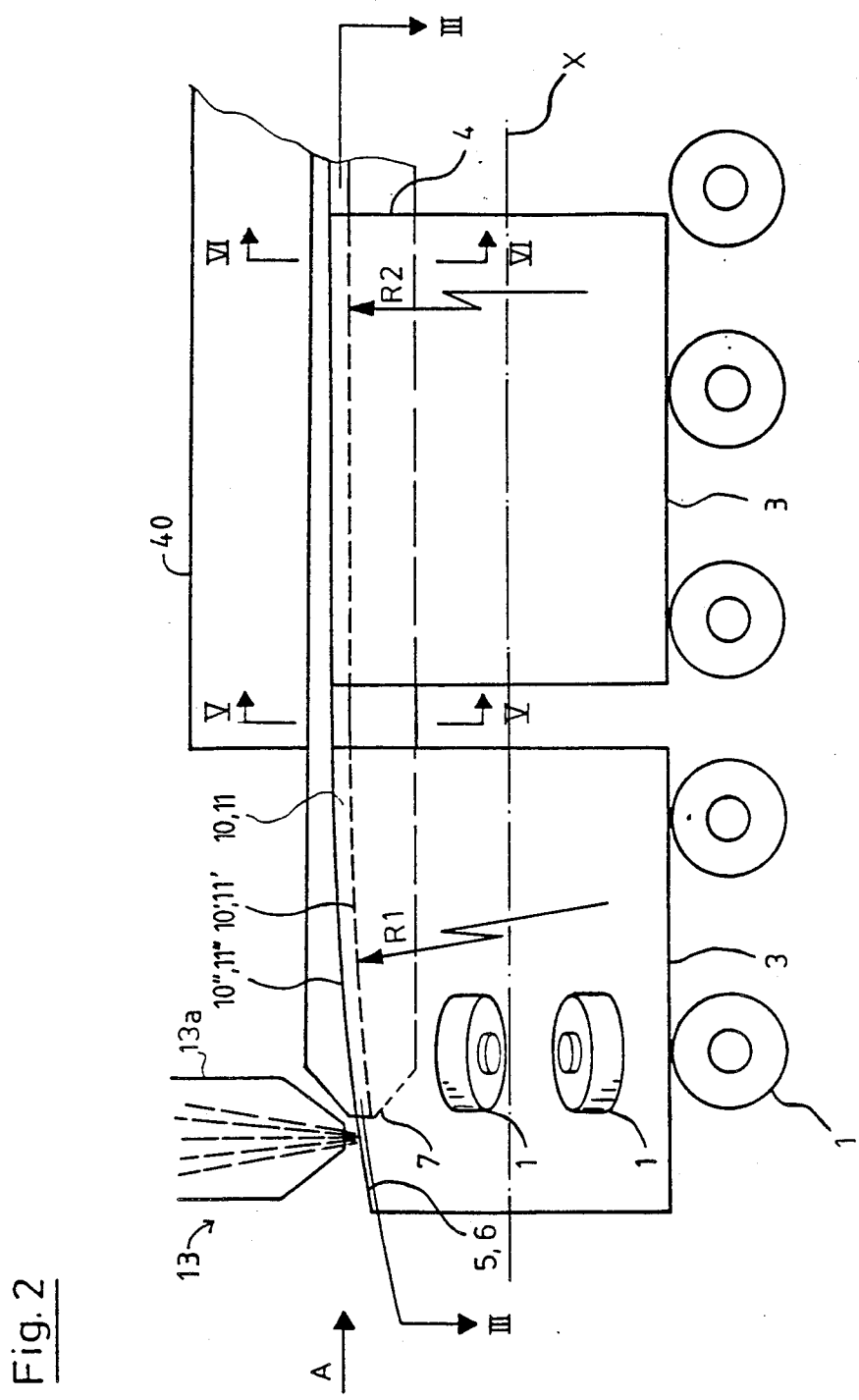
FIG. 2 schematically shows a side view of the guide rail of FIG. 1.

The arcuately curved extent of the guide slots 10 and 11 is more clearly recognizable in FIG. 2 than in FIG. 1. The radius of curvature of the parallelly extending guide slot flanks 10', 10" and 11', 11" is indicated at the exit or outfeed end 7 with the reference character $R_1$. The arcuately curved extent of the guide slots 10 and 11 can be constant over a portion of the guide rail 2. The arcuately curved extent of these guide slots 10 and 11 can also increase in degree from the entry end 4 to the exit end 7. The guide slots 10 and 11 can extend initially straight at the entry end 4. The radius of curvature $R_2$ at the entry end 4 would then approach infinity.

The bases 8 and 9 of the guide slots 10 and 11, respectively, are planar and the distance or spacing of the guide slot flanks 10', 10" and 11', 11" is substantially constant. An energy beam welding head 13a, e.g. a $CO_2$-Laser, is schematically and exemplarily illustrated as a welding source of a welding or joining station 13 and is situated a few millimeters beyond the exit end 7. One or both edges 5 and 6 of a blank or panel of sheet metal or sheet material rolled to a cylinder can be heated to welding temperature by means of this energy beam welding head 13a of the joining or welding station 13.

The blank or panel 3 of sheet metal or sheet material—the unwelded body which may be a very thin blank or panel—is guided by rollers 1 arranged annularly about a geometrical axis X such that both blank or panel edges 5 and 6 can slide or translate in the guide slots 10 and 11 of the guide rail 2. A suitable transport apparatus—not shown for the sake of clarity and not constituting subject matter of the invention—transports or conveys successive blanks or panels 3 shaped in a conventional roll forming station along the guide rail 2 to the welding or joining station 13.

Figure 3:
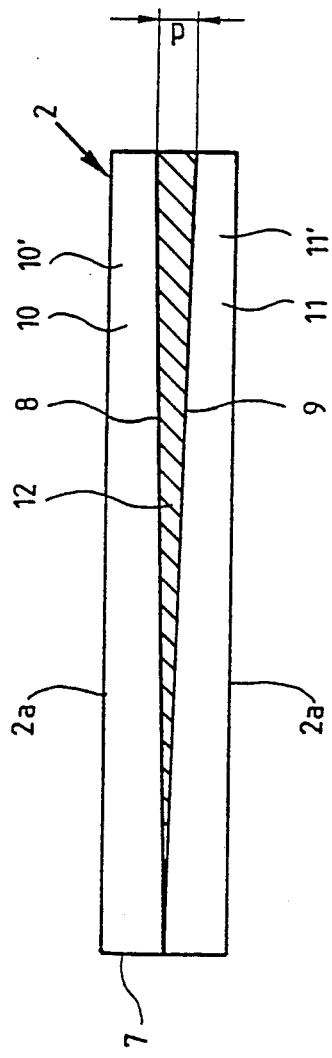
FIG. 3 schematically shows a section through the guide rail taken along the line III—III in FIG. 2.

In the section shown in FIG. 3, which extends through both curved guide slots 10 and 11, the web 12 narrowing or dimnishing toward the exit end 7, is clearly visible. The lateral flanks 10' and 11' of the guide slots 10 and 11, respectively, lie at substantially the same height, so that the edge regions of the blank body 3 guided along the guide rail 2 and separated by the web 12 also lie in the same curved surface and always confronting one another. The spacing of the bases 8 and 9 of the guide slots 10 and 11, respectively, and therefore also of the blank edges 5 and 6, respectively, continuously decreases until these blank edges 5 and 6 reach the exit end 7. For fabrication reasons, the web 12 terminates not in a knife edge but bluntly a few millimeters before the geometrical meeting point of the bases 8 and 9 of the guide slots 10 and 11, respectively, so that contact of the blank edges 5 and 6 does not occur immediately at the end of the web 12.

Figure 4:
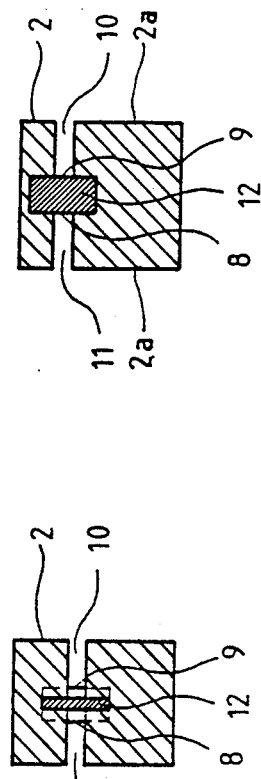
FIG. 4 schematically shows a view of the guide rail looking from the direction of the arrow A in FIG. 2.
Figure 5:
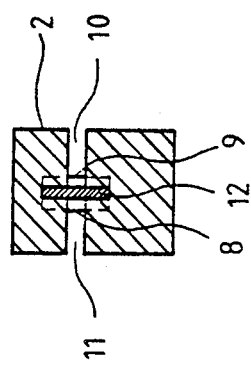
FIG. 5 schematically shows a cross-section through the guide rail taken along the line V—V in FIG. 2.
Figure 6:
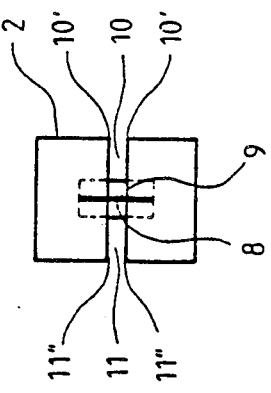
FIG. 6 schematically shows a cross-section through the guide rail taken along the line VI—VI in FIG. 2.
Figure 7:
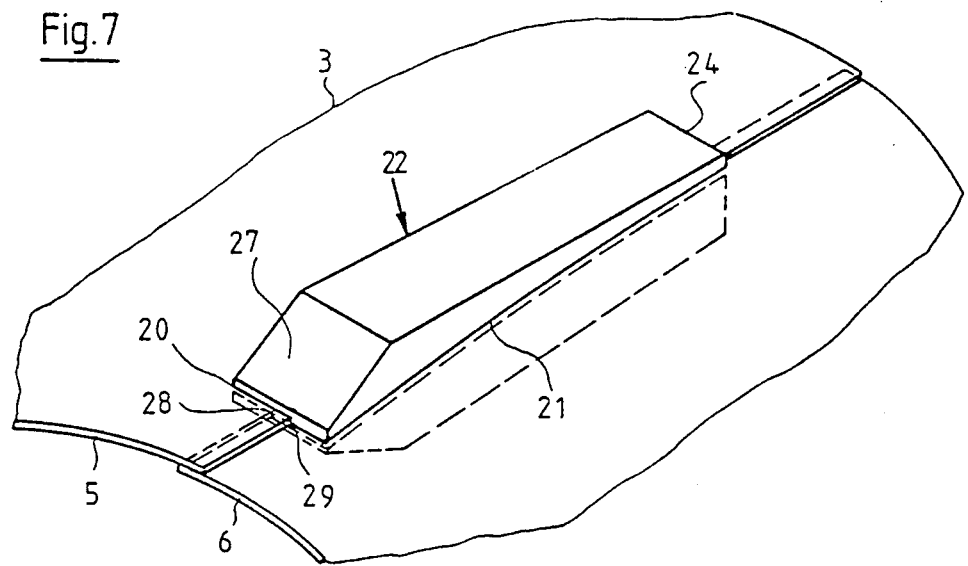
FIG. 7 schematically shows a perspective view of a guide rail for sheet metal edges brought together in overlapping relationship as well as a blank or panel of sheet metal rolled to a cylinder.
Figure 8:
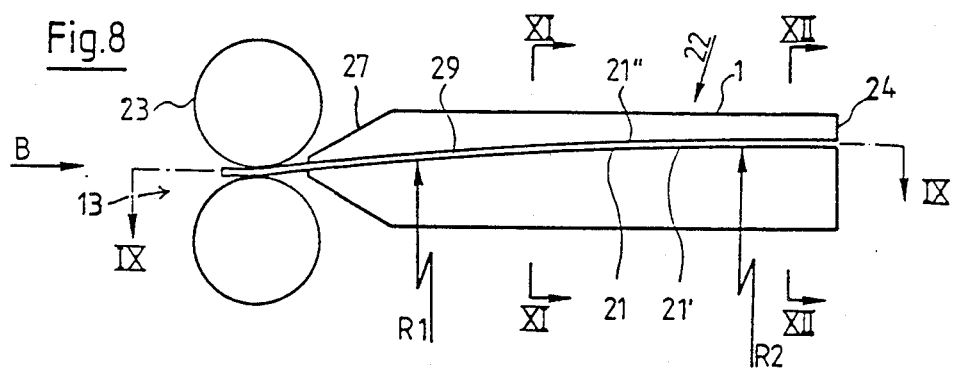
FIG. 8 schematically shows a side view of the guide rail of FIG. 7.

The configuration of the guide slots 10 and 11, respectively of the bases 8 and 9 of these guide slots 10 and 11, respectively, is illustrated in FIGS. 4, 5 and 6 which are a side view and cross-sections of the guide rail 2 at various locations. Instead of fabricating the guide rail 2 from a single piece, which of course would be possible, the web 12 forming the bases 8 and 9 of the guide slots 10 and 11, respectively, can be fabricated from a harder and therefore more wear-resistant material than the other components subjected to less wear. Such a fabrication from components can be advantageous not only for reasons of wear resistance, but also especially for fabricational reasons in the manufacture of the curvedly extending lateral flanks or delimiting walls 10', 10" and 11', 11" of the guide slots 10 and 11, respectively.

In the following, the operation of the guide rail 2 according to FIG. 1 will be explained, partially in comparison to conventional rails, as far as such operation is not already evident to the person skilled in the art from the construction as hereinbefore described. The edges 5 and 6 of the blank or panel 3 of sheet metal or sheet material formed or rolled in conventional manner substantially to a cylinder or can body are introduced into the guide slots 10 and 11 of the guide rail 2 with a mutual horizontal spacing d and are guided along the guide rail 2 by means of a not particularly shown conventional transport system known per se. Due to the bases 8 and 9 of the guide slots 10 and 11, respectively, converging horizontally, the sheet metal or sheet material panel edges 5 and 6 progressively approach one another and meet immediately beyond the exit or outfeed end 7 of the guide rail 2. If the flanks 10', 10" and 11', 11" of the guide slots 10 and 11, respectively, were constructed straight, a V-shaped gap would arise after the first point contact of the forward ends of the blank or panel edges 5 and 6 and no welding or joining operation could be performed. The blank edges 5 and 6, respectively the edge regions of the cylinder or can body formed by the sheet metal or sheet material blank 3, are curved or bent by the curvature of both guide slots 10 and 11 having the radius of curvature $R_1$.

The curvature or bending of the two blank or panel edges 5 and 6, respectively of the associated edge regions, in a direction substantially perpendicular to the transverse curvature of the envelope of the cylinder or can body formed from the blank or panel 3 of sheet metal or sheet material as well as the simultaneous horizontal approach or convergence of the blank edges 5 and 6 toward the exit or outfeed end 7 of the guide rail 2 cause the blank edges 5 and 6 to initially enter into point contact after leaving the guide rail 2 but then to immediately intimately abut one another along their entire extent between the exit end 7 of the guide rail 2 and the welding or joining station 13 after leaving the guide rail 2.

If both cut edges 5 and 6 are completely straight (optimum conditions), then they remain in the bent or curved state and in intimate contact beyond the guide rail 2 due to the mutual biasing or stressing forces induced by the inherent elasticity of the sheet metal or sheet material and can be welded or joined in this form. Subsequently they return to the extended or straight state. If, as in the prior art, one, or indeed both, of the blank or panel edges 5 and 6 exhibits an inwardly curved or bowed cut edge, then these blank or panel edges 5 and 6 only contact one another at a point at the end of the cylinder or can body formed by the sheet metal blank or panel 3 after being transported through a conventional guide rail with straight slots and a reliable weld can not be executed, or no weld at all can be executed, since there is no intimate contact and therefore no welding force because the edge faces of the blank or panel edges 5 and 6 can not touch one another.

In contrast thereto, and according to the invention, such inwardly curved or bowed cut edges 5 and 6 remain in strong contact in the curved guide slots 10 and 11 before and during the welding or joining procedure, so that an impeccable welding or joining operation can be performed. After leaving the guide rail 2, these blank or panel edges 5 and 6 namely also enter immediately into intimate mutual contact. Due to the deficiency of material (curved cut or bow), the edge regions enter into a less curved state and are thus welded or joined. The same is true also for edges having a convexly curved or bowed cut or for edges having a combination of both such irregularities. Two edges with convexly curved or bowed cuts induce supplementary bending after leaving the guide rail 2.

Deviations of the arc height of curved or bowed cuts from precisely straight cuts lie in the region of a few hundredths to a few thousandths of a millimeter in practice and vary in dependence of the length of the edges to be welded. It will therefore be clear that the radii of curvature $R_1$ and $R_2$ must be chosen very large and can lie in the region from one meter to 10 meters or more, preferably about 5 meters. The radii of curvature $R_1$ and $R_2$ of the guide slots 10 and 11 or 20 and 21 advantageously correspond to a height or are lying between 0.3 mm and 2.0 mm within the length of the guide rail 2, respectively the bar-shaped support member. The permanent curvature of the weld joint of panels having bowed-cut edges is so minimal that it will in the worst case only be visible as a slight undulation.

The use of the Z-rail, i.e. the guide rail 2 described herein, is not limited to the welding procedure mentioned above. This Z-rail can namely also be employed in modified form for welding mutually overlapping blank or panel edges 5 and 6.

Figure 9:
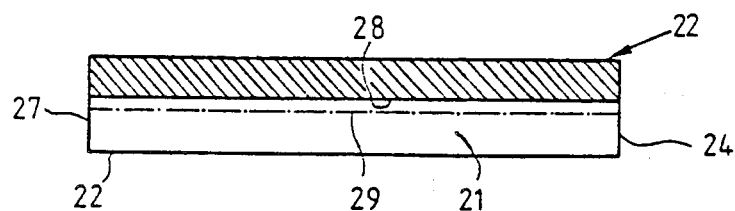
FIG. 9 schematically shows a section through the guide rail taken along the line IX—IX in FIG. 8.

In the guide rail 22 for bringing together sheet metal panel edges 5 and 6 into an overlap illustrated in the FIGS. 7 through 12, two guide slots 20 and 21 are also provided. These guide slots 20 and 21 do not however lie at a common height, but run together or approach one another in vertically staggered relationship in the vertical direction from the entry or infeed end 24 to the exit or outfeed end 27 of the guide rail 22. The bases 28 and 29 of the guide slots 20 and 21 exhibit a spacing approximately equal to the amount of the desired overlap of the blank or panel edges 5 and 6 at the exit end 27 of the guide rail 22. The spacing of the bases 28 and 29 of the guide slots 20 and 21 at the entry end 27 of the guide rail 22 is equal to or less than that at the exit side 27, i.e. the amount of overlap of the sheet metal blank or panel edge regions remains constant or even increases toward the welding location, quite in contrast to conventional Z-rails. As in the guide rail 2 for bringing together two blank or panel edges 5 and 6 in abutting relationship, the guide slots 20 and 21 of the guide rail 22 also exhibit an arcuate curvature (radii $R_1$ and $R_2$) (cf. FIGS. 7 and 8). The solid line 28 in the longitudinal section of FIG. 9 illustrates the base of the lower slot 21 for the blank or panel edge 6, through which the section is taken. The chain-dotted line 29 illustrates the base of the upper slot 20 overlapping the lower slot 21.

Figure 10:
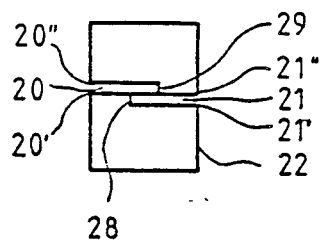
FIG. 10 schematically shows a view of the guide rail taken from the direction of the arrow B in FIG. 8.
Figure 11:
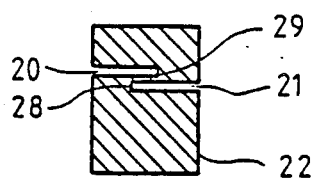
FIG. 11 schematically shows a cross-section through the guide rail taken along the line XI—XI in FIG. 8.
Figure 12:
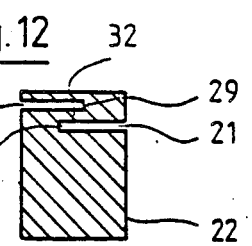
FIG. 12 schematically shows a cross-section through the guide rail taken along the line XII—XII in FIG. 8.

The respective positions of the bases 28 and 29 of the guide slots 20 and 21 can be seen in FIGS. 10 through 12. The flanks 20' and 21" meet at the exit end 24 (cf. FIG. 10), so that the regions of the cylinder or can body formed by the sheet metal or sheet material blank 3 extending along the blank edges 5 and 6 come to lie upon one another. In the center of the guide rail 22 (cf. FIG. 11) there is a spacing between the flanks 20' and 21" which increases toward the entry end 24 (cf. FIG. 12). The web 32 between the two guide slots 20 and 21 has the sole purpose of rendering the guide rail 22 sufficiently stable for the forces acting thereupon, i.e. to establish a connection between the components lying above and below the guide slots 20 and 21. Theoretically, the sheet metal blank edges 5 and 6 could be conducted lying upon one another over the entire length of the guide rail 22 without departing from the basic concepts of the present invention. This is, however, as already mentioned, technically impossible.

The operation of the guide rail 22 is analogous to that of the guide rail 2. Since both blank or panel edges 5 and 6 now, however, do not abut one another in a common plane but lie in mutually overlapping relationship, the following occurs: both blank or panel edges 5 and 6 leave the guide rail 22 with an overlap of, for instance, 0.5 mm. The forwardmost edge portions are welded together when they arrive at the welding location of the welding or joining station 13, e.g. by a pair of roller electrodes 23. As usual in so-called line pressure welding, both blank or panel edges 5 and 6 tend to spread. In conventional Z-rails with straight guide slot flanks 20', 20" and 21', 21" this spreading effect is forceably countered or suppressed with the initially mentioned straight guide slots and by biasing or stressing means (calibrating roller ring in the welding plane) as well as by roller electrodes with skew axes. In the guide rail 22 with curved guide slots 20 and 21, the curved blank or panel edges 5 and 6 in contrast try to return to the extended or straight condition due to their inherent elasticity. Because they are, however, already welded together at the forward end of both edges 5 and 6, the return of these edges 5 and 6 into the plane (a plane tangent to the weld joint) causes the subsequent unwelded edge regions to slide over one another. Supplementary biasing or stressing means loading the thin sheet metal or sheet material can therefore be omitted.

Figure 13:
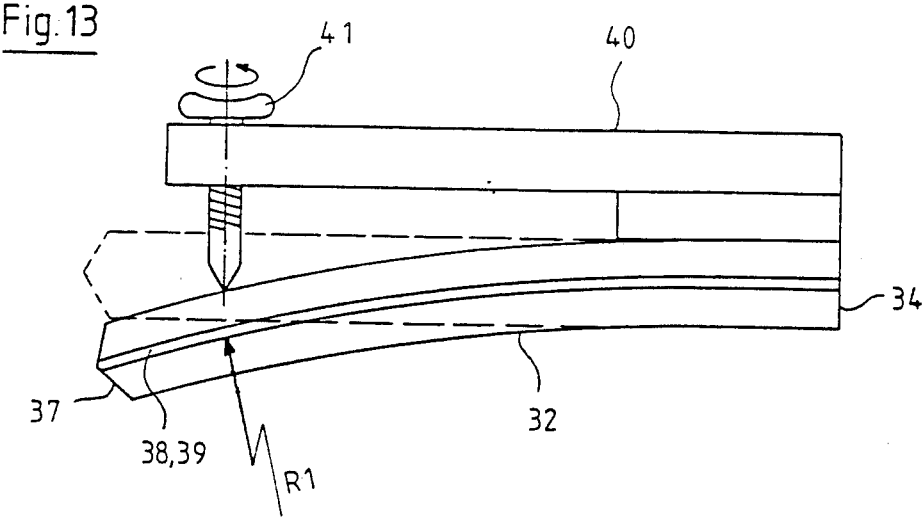
FIG. 13 schematically shows a view of a guide rail with a straight slot and an apparatus for curving the slot.

In a further embodiment of the invention according to FIG. 13, the arcuate curvature of guide slots 38 and 39 is produced by bending the guide rail 32. The guide rail 32 is therefore fixedly mounted, e.g. fixedly screwed to a machine frame 40, at an entry or infeed end 34. A free exit or outfeed end 37 is loaded in bending by a biasing means, e.g. a biasing screw 41 connected with the machine frame 40. The original extended or straight condition is indicated in dotted lines. It will be understood that the amount of bending or deflection is illustrated greatly exaggerated in FIG. 13 for reasons of clarity. In reality, the radius $R_1$ amounts to a value between one meter and 10 or more meters, as in the previously described embodiments, and therefore the bending or deflection of a guide rail 32 which is 150 mm long amounts to a value lying between a few tenths of a millimeter and a few millimeters.

An eccentric disk or any other suitable machine element which is capable of exerting a force on the exit or outfeed end 37 of the guide rail 32 can be employed as the biasing means 41.

Figure 14:
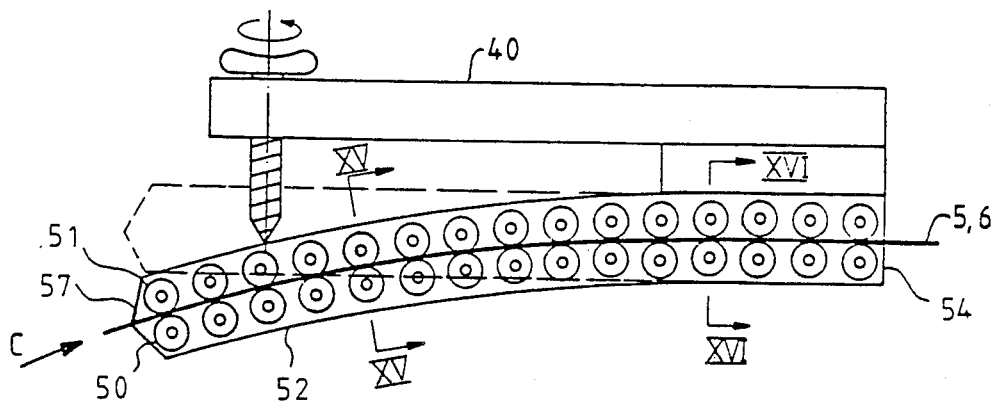
FIG. 14 schematically shows a view of a guide apparatus comprising rollers.
Figure 15:
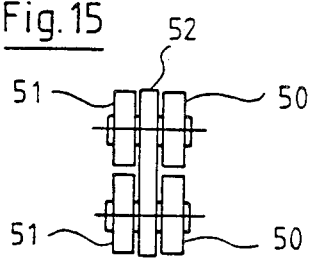
FIG. 15 schematically shows a cross-section taken along the line XV—XV in FIG. 14.
Figure 16:
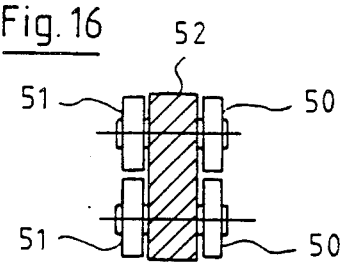
FIG. 16 schematically shows a cross-section taken along the line XVI—XVI in FIG. 14.

Another embodiment of the invention is illustrated in the FIGS. 14, 15 and 16. A plurality of rollers 50 and 51 arranged in pairs are rotatably mounted on a web 52 constructed as a support body. Just enough space is left free between the rollers 50 and 51 to allow the blank or panel edges 5 and 6 of a sheet metal or sheet material blank or panel 3 to pass through unhindered. The web 52 preferably comprises a hard, wear-resistant surface in the region of the gap between the rollers 50 and 51. The rollers 50 and 51 advantageously also have a hard surface. They can, however, also be made of a hard, wear-resistant material, e.g. ceramic.

The slot-shaped guidance or guide means formed by the plurality of gaps or guide slots between the rollers 50 and 51 on both sides of the web 52 can be given a curvature either by bending the web 52 carrying the rollers 50 and 51, as shown in FIG. 14, or by mounting the rotational axes of the rollers 50 and 51 on the web 52 along a curved line. The slot-shaped guide means extending between the rollers 50 and 51 defines a clamping line for the edge regions of the formed sheet material blank 3.

As in the other embodiments, the thickness of the web 52 decreases from an entry or infeed end 54 to an exit or outfeed end 57 and converges in a more or less sharp edge at that point (cf. FIGS. 15 and 16).

The operation of the embodiment described in relation to FIGS. 13 through 16 is the same as for the embodiment according to FIGS. 1 through 6. The amount by which the exit ends 37 and 57 of the guide rails 32 and 52, respectively, are downwardly bent lies in the range of a few tenths of a millimeter to a few millimeters according to the length of the flexible or deflectable region of the guide rail.

While there are shown and described present preferred embodiments of the invention, it is to be distinctly understood that the invention is not limited thereto, but may be otherwise variously embodied and practiced within the scope of the following claims. Accordingly,

What I claim is:

1. A method for bringing together the edges of a blank of sheet metal formed to a cylinder during transport of the formed blank from a forming machine to a joining station having a guide apparatus for conducting the blank into the joining station, comprising the step of:
   arcuately curving edges of said blank longitudinally of said blank and toward a longitudinal axis of said cylinder before said edges enter into mutual contact and before said edges subsequently arrive in said joining station.

2. The method as defined in claim 1, wherein:
   said blank of sheet metal is formed to a cylinder by rolling; and
   said forming machine comprises a rolling machine.

3. The method as defined in claim 1, wherein:
   said edges of the blank are arcuately curved longitudinally of said blank in said guide apparatus increasingly out of an initially straight condition toward said joining station.

4. The method as defined in claim 1, wherein:
   said edges of the blank are arcuately curved longitudinally of said blank by bending the guide apparatus into an arcuately curved configuration longitudinally thereof and out of an initially straight condition thereof.

5. A method for uniting the edge regions of a blank of sheet material, comprising the steps of:
   transporting a blank formed to a substantially cylindrical shape having an axis of rotational symmetry to a guide apparatus;
   conducting said formed blank into said guide apparatus with confronting edge regions thereof;
   conducting said formed blank through said guide apparatus to arcuately curve said edge regions longitudinally inward toward said axis of rotational symmetry such that said edge regions enter into mutually abutting contact;
   further conducting said formed blank with said edge regions thereof in mutually abutting contact to a joining station arranged immediately subsequent to said guide apparatus; and
   joining said mutually abutting edge regions together in said joining station to form a permanently closed substantially cylindrical thin wall tube.

6. The method as defined in claim 5, wherein:
   said mutually abutting contact comprises edge contact in planar alignment of said edge regions.

7. The method as defined in claim 5, wherein:
   said mutually abutting contact comprises laterally overlapping contact of said edge regions.

8. A guide rail for bringing together the edges of a blank of sheet metal rolled to form a cylinder having a longitudinal axis, especially a very thin blank of sheet metal or the like, during transport of the blank from a forming machine to a joining station, comprising:
   a substantially bar-shaped support member arranged immediately before said joining station and containing two laterally arranged guide slots for said edges of said blank;
   said bar-shaped support member having an entry end and an exit end;
   said two guide slots approaching one another from said entry end towards said exit end;
   said two guide slots having an arcuate extent curved toward said longitudinal axis of said cylinder and guiding edge regions of said blank of sheet metal;
   said two guide slots having a radius of curvature; and
   said radius of curvature decreasing from said entry end to said exit end of said bar-shaped support member.

9. A guide rail for bringing together the edges of a blank of sheet metal rolled to form a cylinder having a longitudinal axis, especially a very thin blank of sheet metal or the like, during transport of the blank from a forming machine to a joining station, comprising:
   a substantially bar-shaped support member arranged immediately before said joining station and containing two laterally arranged guide slots for said edges of said blank;
   said bar-shaped support member having an entry end and an exit end;
   said two guide slots approaching one another from said entry end towards said exit end; and said two guide slots having an arcuate extent curved longitudinally and toward said longitudinal axis of said cylinder and guiding edge regions of said blank of sheet metal.

10. The guide rail as defined in claim 8, wherein:
said two guide slots extend initially straightly; and
said two guide slots extending curvedly shortly before said exit end.

11. The guide rail as defined in claim 8, wherein:
said two guide slots having said arcuate extent curved longitudinally and toward said longitudinal axis of said cylinder define a common radius of curvature; and
said common radius of curvature of said two guide slots lying between one meter and ten meters.

12. The guide rail as defined in claim 8, wherein:
said two guide slots having said arcuate extent curved longitudinal and toward said longitudinal axis of said cylinder define a common radius of curvture; and
said common radius of curvature of said two guide slots corresponding to a height of arc lying between 0.3 mm and 2 mm with respect to the length of the bar-shaped support member.

13. The guide rail as defined in claim 11, wherein:
said radius of curvature is five meters at said exit end of the bar-shaped support member.

14. The guide rail as defined in claim 8, wherein:
said two guide slots extend in substantially mutually parallel and mutually opposing relationship.

15. The guide rail as defined in claim 8, wherein:
said two guide slots each have a guide slot base;
a web separating said two guide slots and narrowing from said entry end to said exit end of said bar-shaped support member; and
said web forming said guide slot bases.

16. The guide rail as defined in claim 15, wherein:
said web comprises a hard, wear-resistant material.

17. The guide rail as defined in claim 8, wherein:
said two guide slots are arranged in mutually vertically staggered relationship; and
said two guide slots mutually overlap by an amount substantially corresponding to a desired overlap of said edges of said blank in said joining station.

18. The guide rail as defined in claim 17, wherein:
said two guide slots mutually overlap at said entry end of said bar-shaped support member by a lesser amount than at said exit end of said bar-shaped support member.

19. A guide rail for bringing together the edges of a blank of sheet metal rolled to form a cylinder having a longitudinal axis, especially a very thin blank of sheet metal or the like, during transport of the blank from a forming machine to a joining station, comprising:
a substantially bar-shaped support member arranged immediately before said joining station and containing two laterally arranged guide slots for said edges of said blank;
said bar-shaped support member having an entry end and an exit end;
said two guide slots approaching one another from said entry end towards said exit end;
said two guide slots having an arcuate extent curved toward said longitudinal axis of said cylinder and guiding edge regions of said blank of sheet metal;
said bar-shaped support member comprising a plurality of rollers arranged in two rows extending substantially mutually parallelly;
said rollers defining a clamping line; and
said clamping line forming a slot-shaped guide means for said edges of said blanks.

20. The guide rail as defined in claim 19, wherein:
said bar-shaped support body includes a web for supporting said rollers; and
said web forming a base of said slot-shaped guide means.

21. The guide rail as defined in claim 20, wherein:
said slot-shaped guide means has a radius of curvture which is formed by bending said web.

22. A guide rail for bringing together the edges of a blank of sheet metal rolled to form a cylinder having a longitudinal axis, especially a very thin blank of sheet metal or the like, during transport of the blank from a forming machine to a joining station, comprising:
a substantially bar-shaped support member arranged immediately before said joining station and containing two laterally arranged guide slots for said edges of said blank;
said bar-shaped support member having an entry end and an exit end;
said two guide slots approaching one another from said entry end towards said exit end;
said two guide slots having an arcuate extent curved toward said longitudinal axis of said cylinder and guiding edge regions of said blank of sheet metal;
said two guide slots having a radius of curvature;
said radius of curvature decreasing from said entry end to said exit end of said bar-shaped support member; and
said radius of curvature of said two guide slots being formed by bending said guide rail.

23. A guide apparatus for uniting the edge regions of a blank of sheet material formed into a substantially cylindrical shape having an axis of rotational symmetry, comprising:
a substantially bar-shaped body provided with two laterally opposite guide slots extending longitudinally therethrough in mutually spaced relationship for guiding said edge regions of the blank through said guide apparatus;
a joining station arranged immediately subsequent to said bar-shaped body;
said bar-shaped body having an entry end remote from said joining station and an exit end approximate to said joining station;
said mutually spaced relationship of said guide slots diminishing from said entry end to said exit end; and
said two guide slots extending in a path curving longitudinally of said bar-shaped body and inwardly toward said axis of rotational symmetry of said substantially cylindrical shape of the formed blank.

* * * * *

UNITED STATES PATENT AND TRADEMARK OFFICE
CERTIFICATE OF CORRECTION

PATENT NO. : 4,635,841

DATED : January 13, 1987

INVENTOR(S) : SIEGFRIED FREI

It is certified that error appears in the above-identified patent and that said Letters Patent is hereby corrected as shown below:

Claim 10, line 1, please delete "8" and insert --9--

Claim 11, line 1, please delete "8" and insert --9--

Claim 12, line 1, please delete "8" and insert --9--

Claim 14, line 1, please delete "8" and insert --9--

Claim 15, line 1, please delete "8" and insert --9--

Claim 17, line 1, please delete "8" and insert --9--

Claim 21, line 2, after "of" (at the end of the line), please delete "curvture" and insert --curvature--

Signed and Sealed this

Eleventh Day of August, 1987

*Attest:*

*Attesting Officer*

DONALD J. QUIGG

*Commissioner of Patents and Trademarks*